Nov. 7, 1950
W. A. SHIELDS
2,529,109
APPARATUS FOR SEALING TUBULAR GLASS ARTICLES
Filed Oct. 29, 1946
3 Sheets-Sheet 1
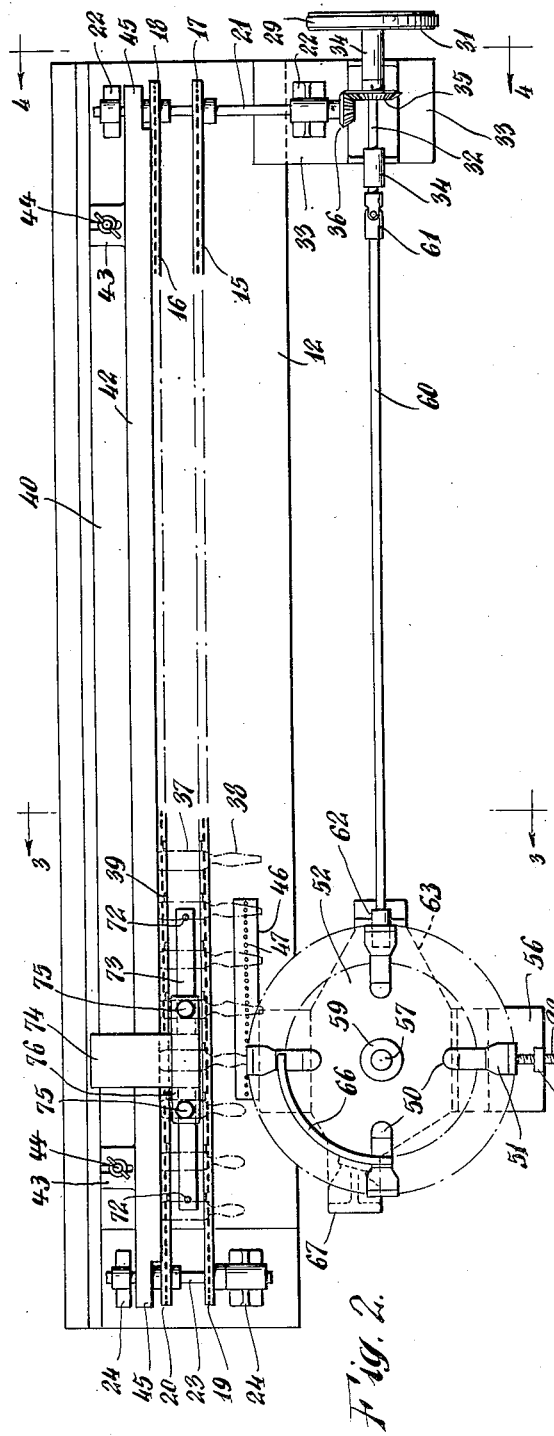
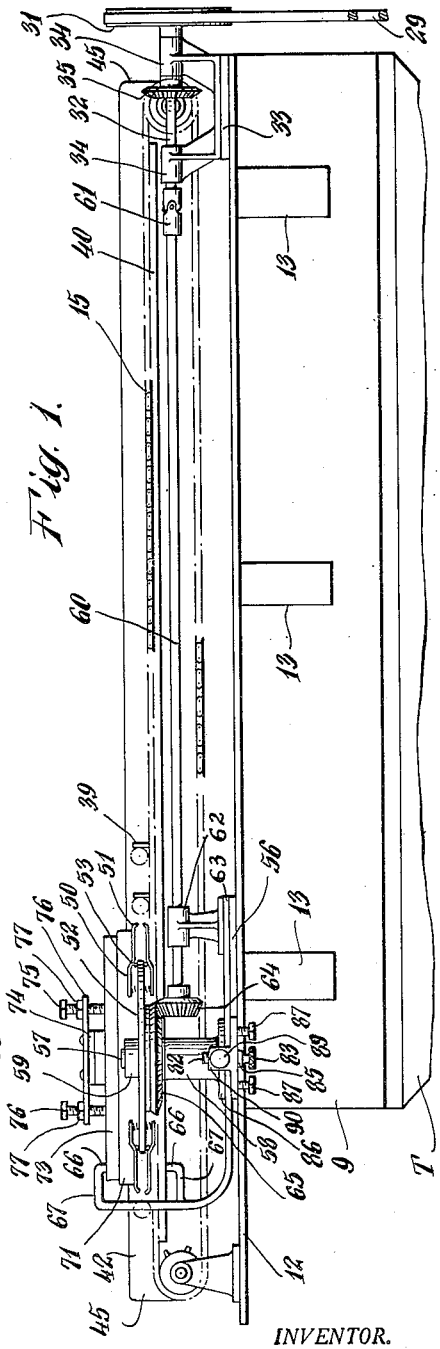
INVENTOR.
W. A. Shields
BY
John A. Seifert
ATTORNEY.

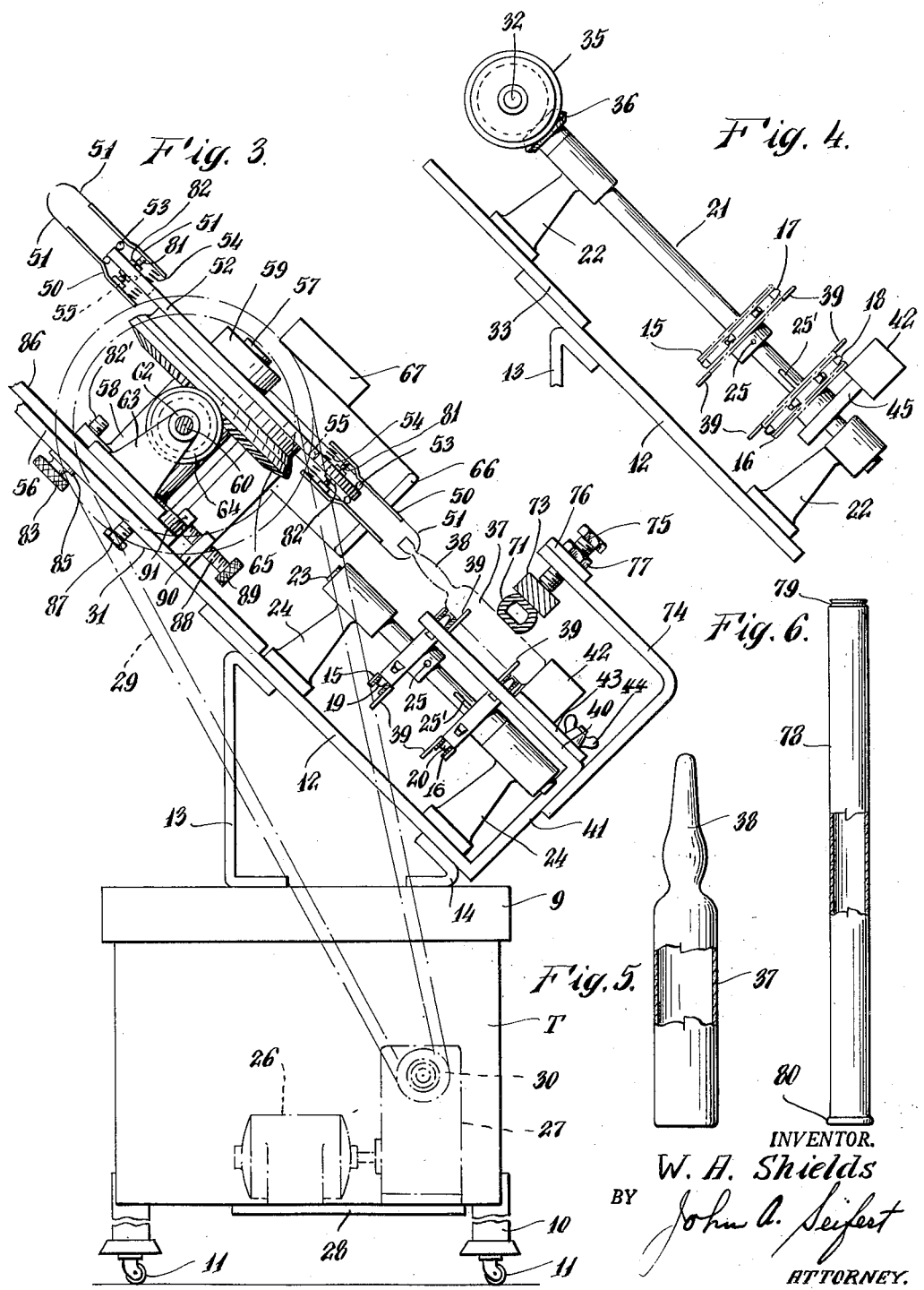

Nov. 7, 1950  W. A. SHIELDS  2,529,109
APPARATUS FOR SEALING TUBULAR GLASS ARTICLES
Filed Oct. 29, 1946  3 Sheets-Sheet 3
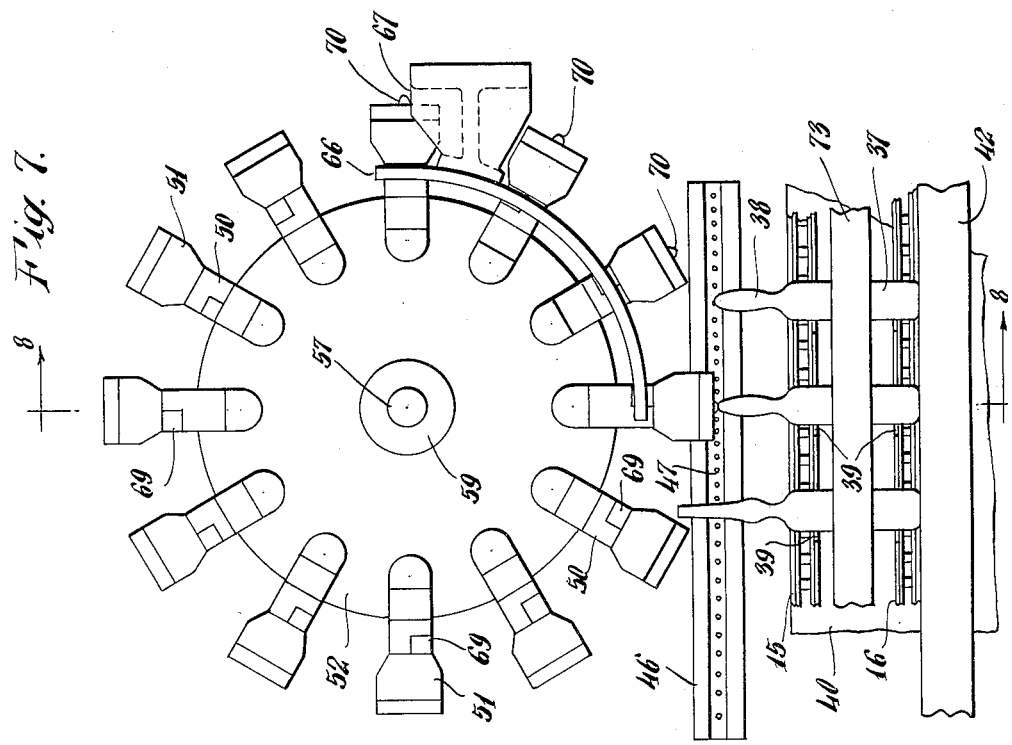
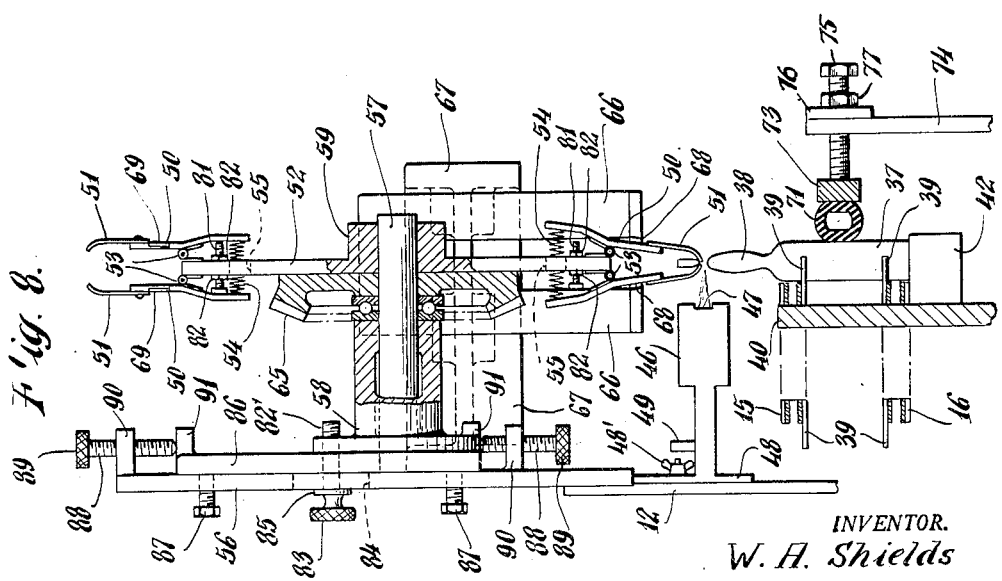
INVENTOR.
W. A. Shields
BY
John A. Seifert
ATTORNEY.

Patented Nov. 7, 1950

2,529,109

UNITED STATES PATENT OFFICE 2,529,109

APPARATUS FOR SEALING TUBULAR GLASS ARTICLES

Walter A. Shields, Jamaica, N. Y.

Application October 29, 1946, Serial No. 706,355

18 Claims. (Cl. 49—7)

This application relates to apparatus for sealing or closing the ends of tubular glass articles and particularly to the sealing of the filler opening of filled vials.

It is an object of the invention to seal the ends of tubular glass articles at a greater rate than it has been possible in the type of apparatus now in commercial use.

It is another object of the invention to continuously convey tubular glass articles relative to a heating element to heat an end portion of the articles and a series of sealing members continuously traveling relative to the heated end portions of the articles to engage said heated end portions and traveling in a diverging path from the path of travel of the heated end portions to seal said heated end portions.

It is another object of the invention to rotate the tubular glass articles during the travel thereof relative to the heating element and sealing members to assure an even heating and sealing of said articles.

It is a further object of the invention to provide an adjustable conveyer and article supporting bar whereby articles of different lengths may be sealed by the same apparatus without adjusting the heating element and the path of travel of the sealing members.

Another object of the invention is to provide sealing members in the form of jaws having gripping portions of resilient material to prevent an undue amount of breakage of the articles during the sealing operation.

A further object of the invention is to loosely support filled vials on a conveyer without spilling the contents of said vials during the travel of the vials on said conveyer.

A further object of the invention is to provide a rotary head carrying a series of spaced sealing members mounted to have adjustment toward and away from the conveyer and adjustably position the sealing members to seal vials having neck portions of different lengths.

A further object of the invention is to adjustably mount the head to have movement along its axis of rotation to properly position the sealing members to seal articles of different diameters.

A still further object of the invention is to provide adjustment of the heating element toward and away from the conveyer to properly heat vials having neck portions of different lengths.

Other objects and advantages of the invention will hereinafter appear in the detailed description thereof.

In the drawings accompanying and forming a part of this application, Figure 1 is a plan view of the apparatus forming the embodiment of the invention.

Figure 2 is a side view of said apparatus shown in Figure 1.

Figure 3 is an end elevational view, on an enlarged scale, of the apparatus looking from the line 3—3 of Figure 2.

Figure 4 is a fragmentary view in end elevation of the conveyer and drive shaft therefor looking from the line 4—4 of Figure 2.

Figure 5 is a side elevation partly in section of a vial sealed by the apparatus of the application.

Figure 6 is a side elevation partly in section of a tubular article having the bottom closed by the same apparatus.

Figure 7 is a top view of the sealing members mounted on the rotary head and a portion of the conveyer relative to the heating element and showing an unsealed vial, a vial being sealed and a sealed vial on the conveyer.

Figure 8 is a sectional view taken on the line 8—8 of Figure 7 looking in the direction of the arrows.

The embodiment of the invention as illustrated in the accompanying drawings comprises a table T having a flat top 9 and leg portions 10 supported by casters 11 to permit the table to be transported to any desired location.

The table top 9 supports a platform or shelf 12 at an angle thereto by brackets 13 and 14, as shown in Figures 1 and 3. In the present illustration of the invention, the angle of inclination of the platform 12 is shown to be approximately forty-five degrees, but said angle may vary accordingly to the type of tubular glass articles being sealed by the apparatus.

The articles to be sealed are continuously transported along the table at the angle of inclination of the platform 12 by a conveyer comprising a pair of endless sprocket chains 15, 16 supported in parallel spaced relation to each other by pairs of spaced sprocket wheels 17, 18 and 19, 20. The sprocket wheels 17, 18 are mounted on and rotatable with a shaft 21 rotatably supported at the opposite end portions by bearings 22 mounted on the platform 12 with the shaft extending parallelly of said platform, as shown in Figure 4. The sprocket wheels 19, 20 are mounted on and rotatable with a shaft 23 rotatably supported at the opposite end portions by bearings 24 mounted on the platform 12, as shown in Figures 2 and 3. The sprocket wheels 17 and 19 are fixed on the shafts 21 and 23, respectively, as shown at 25 in Figures 3 and 4, and the sprocket wheels 18 and 20 are fixed to the shafts 21 and 23, respectively, by keys 25', as shown in Figures 3 and 4, to permit sliding adjustment of said sprocket wheels 18 and 20 on the shafts 21 and 23, respectively, for a purpose to be hereinafter described. The sprocket chains are continuously actuated from a suitable source of power shown as an electric motor 26 connected to and driving a speed reduction mechanism 27, both being mounted on a shelf 28 supported by the bottom of the table T, as shown in Figure 3. The speed reduction mechanism 27 is operatively connected to the shaft 21 through a transmission belt 29 engaged around a pulley 30 fixed on the power shaft of the speed reduction mechanism and a pulley 31 fixed on a shaft 32 rotatably supported on an extension 33 of the platform 12 by bracket bearings 34 mounted on said platform extension 33. The shaft 32 is operatively connected to the shaft 21 through a beveled gear 35 fixed on the shaft 32 and meshing with a beveled gear 36 fixed on an end of the shaft 21 projecting from one of the bearings 22 mounted on the extension 33, as shown in Figures 2 and 4.

The articles are shown in Figures 1 to 5, inclusive, 7 and 8 as vials having a straight wall body portion 37 closed at one end and an elongated neck portion 38 forming the filler opening for the body portion at the opposite end thereof. The vials are continuously conveyed by the sprocket chains 15 and 16 in equidistantly spaced relation to each other by providing corresponding links of each of said sprocket chains with projections 39 extending from the outer faces of the chains to engage the body portions 37 of the vials in the upper stretches of travel of the chains. The travel of the vials on the upper stretches of the sprocket chains 15, 16 is maintained in an even plane parallel to the platform 12 by a plate 40 supported from the platform by brackets 41 and having the opposite ends terminating in spaced relation to the peripheries of the sprocket wheels 17—20 to engage and support the upper stretches of the sprocket chains, as shown in Figure 3.

The vials are retained on the sprocket chains 15, 16 in engagement with the projections 39 and the neck portions 38 projecting from the sprocket chain 15 by a bar 42 adjustably mounted on the upper face of the plate 40 by brackets 43 fixed to the bar and adjustably retained on the plate 40 by bolts fixed in the plate and engaging in slots in the brackets and wing nuts screw threaded on the bolts and abutting the brackets, as shown at 44 in Figures 2 and 3. The opposite end portions of the bar 42 are connected to the sprocket wheels 18 and 20 by an arm 45 fixed at one end to said opposite end portions and the opposite ends of the arms abutting the hubs of the sprocket wheels 18 and 20, as shown in Figure 4, so that the bar 42 extends in juxtaposed parallel relation to the sprocket chain 16 to engage the closed ends of the vials and retain the vials on the sprocket chains at an angle corresponding to the angle of inclination of the plate 40. The angle of inclination of the shafts 21, 23 will maintain the wheels 18, 20 in abutment with the arms 45 by the force of gravity, as shown in Figure 4. When it is desired to convey vials or other tubular glass articles of different lengths, the wing nuts 44 are loosened to permit adjustment of the bar 42 on the plate 40 and said adjustment of the bar adjusting the sprocket wheels 18 and 20 along the keys 25' on their respective shafts 21 and 23 through the arms. The bar 42 and sprocket wheels 18 and 20 are retained in their adjusted positions by tightening the wing nuts 44.

The vials are deposited on the upper stretches of the sprocket chains 15 and 16 adjacent to the sprocket wheels 17 and 18 by hand or suitable transferring means from a filling machine (not shown) where they are filled with liquid or other substances up to the juncture between the body and neck portions of the vials, so that tilting of the vials at an angle of forty-five degrees will not spill the contents through the filler openings in the neck portions. The travel of the sprocket chains 15 and 16 convey the neck portions of the vials relative to a heating element shown as comprising a gas burner 46 having a row of orifices 47 positioned below the line of travel of the neck portions and adjustably mounted on the platform 12 by a base portion 48 having a slot therein for sliding engagement of a bolt fixed in the platform 12 with the end portion of the bolt projecting from the base 48 engaged by a wing nut to secure the burner in adjusted position relative to the path of travel of the neck portions 38, as shown at 48' in Figure 8. The burner is connected in communication to a source of gas supply by connecting a pipe, not shown, to a nipple 49 of the burner. The gas flame is directed to an intermediate section of the neck portions 38 between the juncture of the body portion with said neck portion and the extremity thereof to render the extremity and a greater portion of the neck portions plastic. The adjustment of the burner on the platform 12 toward and away from the sprocket chain 15 permits positioning of the gas flame at the proper section of the neck portions 38 of different lengths.

During the travel of the vials relative to the heating element, the extremities of the neck portions 38 of the vials are removed from the neck portions by a pulling force which draws the material of the neck portions at said point of removal together to seal the filler openings of the vials. This is accomplished in the present embodiment of the invention by a series of sealing members in the form of jaws, each jaw consisting of a pair of pivoted members 50 having clamping or gripping portions 51 of resilient material, such as spring metal, fixed at one end to one end of the members 50 and the opposite end sections of the clamping portions curved inwardly toward each other, as shown in Figures 3 and 8. The jaws are equidistantly spaced around the periphery of a circular head 52 by hinge members 53 connected to an intermediate portion of the jaw members 50 and the opposite faces of the head with the clamping portions 51 extending from the periphery of the head 52. The resilient clamping portions 51 of each jaw are yieldingly positioned in spaced relation to each other by a spring 54 anchored at the opposite ends to the ends of the members 50 opposite the ends arranged with the clamping portions 51 and said spring extending through an opening 55 in the head 52, as shown in dotted lines in Figures 3 and 8. The clamping portions 51 are positioned in predetermined spaced relation under the force of the springs 54 by an abutment in the form of a screw 81 screw threaded in the head adjacent to each of the openings 55 with the opposite ends of the screw abutting the jaw members 50 adjacent to the anchorages of the springs 54 to limit the movement of said end portions of the jaw members toward each other, and the screws 81 are retained in adjusted position by locking nuts 82, as shown in Figures 3 and 8. The head is rotatably supported by an extension 56 of the platform 12 through a stud shaft 57 rotatably mounted at one end in a boss bearing 58 adjustably mounted on the platform extension 56 and the opposite end of the stud shaft fixedly engaged in a boss 59 in the center of the head 52. The boss bearing 58 is adjustably mounted on the platform extension 56 by an adjusting screw 82' having a finger engaging head 83 at one end and slidably mounted in a slot 84 in the platform extension 56 of less width than a shoulder 85 below the head 83. The screw 82' is screw threaded in an elongated base 86 of the boss bearing 59, whereby adjustment of the screw raises and lowers the head 52 relative to the platform extension 56 and positions the jaw clamping portions 51 in axial alinement with the neck portions 38. The adjustment of the jaw clamping members 51 in axial alinement with the neck portions 38 will compensate for vials of different diameters which will raise and lower the neck portions relative to the platform 12. The head 52 is retained in adjusted lowered or raised position by set screws 87 screw threaded in the platform extension 56 to abut the base 86, as shown in Figures 1, 3 and 8. The periphery of the head is adjusted toward and away from the path of travel of the neck portions to compensate for neck portions of different lengths by adjusting screws 88 having finger engaging heads 89 at one end and screw threaded in ears 90 fixed to and extending from the platform extension 56 to abut flanges 91 at the opposite ends of the base 86. The loosening of the set screws 87 will facilitate the adjustment of the head 52 toward and away from the path of travel of the neck portions 38 by adjusting the screws 88 in the proper direction, and the slot 84 will permit the movement of the screw 82' without interfering with the adjustment of the head 52 by the screws 88.

The head 52 is continuously rotated in the direction of travel of the sprocket chains 15 and 16 to successively position the spaced apart clamping portions 51 of the jaws relative to the heated extremities of the neck portions 38 of the vials. This continuous rotation is accomplished by operatively connecting the head 52 to the shaft 32 through a shaft 60 connected at one end to the free end of the shaft 32 through an universal joint connection 61 and the opposite end portion of the shaft 60 supported by a bearing 62 mounted on a bracket 63 fixed to the platform extension 56. The free end of the shaft 60 extending from the bearing 62 carries a beveled gear 64 meshing with a beveled gear 65 mounted on and fixed to the stud shaft 57 between the bosses 58 and 59 and thereby transmitting the rotation of the shaft 32 to the stud shaft 57 and the head 52. The universal joint connection 61 permits adjustment of the head 52 by the adjusting screws 82' and 88. The sprocket chains 15 and 16 will travel in synchronism with the rotation of the head 52 so that the successive vials on said sprocket chains will travel with and be engaged by corresponding jaws 50, 51 on the head 52.

Simultaneously with the positioning of the spaced apart clamping portions 51 of a jaw relative to the heated extremity of the neck portion 38 of a vial on the chains 15 and 16, said clamping portions are actuated toward each other against the force of the spring 54 into engagement with said extremity and the travel of the clamping portions in an arcuate diverging direction from the path of travel of the vial pulling the engaged extremity from said neck portion and sealing the neck portion by said pulling action. This is accomplished by a pair of opposed spaced rails 66 of arcuate shape in longitudinal section and mounted to extend in the path of travel of the jaw members 50 by brackets 67 mounted on the platform extension 56. To facilitate engagement of the jaw members 50 with the rails 66, the opposed edges of the rails are beveled at the forward ends thereof, as shown at 68 in Figure 8, and the members 50 are arranged with notches having the bottom wall inclining from the forward edges of the said members, as shown at 69. The length of the rails are slightly greater than one quarter of the circumference of the head 52 and the rails are mounted in spaced relation to the periphery of said head, so that the forward beveled ends 68 will extend slightly beyond the axis of alinement of a jaw 50, 51 and a vial on the sprocket chains 15 and 16, and the forward ends extend slightly beyond ninety degrees from said axis of alinement, as shown in Figure 7, whereby the extremities of the vial neck portions 38 engaged by the clamping portions 51 are conveyed from the path of travel of the vials, as indicated at 70 in Figure 7, and are released from said clamping portions when the jaw members 50 are disengaged from the rails 66 by the continuous travel of the head 52 and the clamping portions 51 are actuated from each other by the springs 54. The released extremities 70 may drop into a suitable depository, not shown.

After the vials are sealed they are removed from the sprocket chains 15 and 16 by permitting said vials to move from the chains at the sprocket wheels 19 and 20 by the forward movement of the succeeding vials upon a suitable tray, not shown, supported by the table T to extend at the angle of inclination of the chains.

To assure an even heating and rounding of the sealed ends of the neck portions 38, the vials are rotated while being conveyed by the sprocket chains past the heating element 46—49 and the sealing element 50—55 by a tubular member 71 of resilient material, such as rubber, secured at the opposite ends by suitable securing means 72, such as rivets as shown in Figure 2, to a bar 73 adjustably supported from an angle shaped bracket 74 having one angle portion fixed to the front edge of the plate 40 and the other angle portion extended over the vials on the sprocket chains 15 and 16. The bar 73 is adjustably supported from the bracket 74 by screws 75 having one end rotatably secured in the bar 73 and adjustably mounted in the opposite end portions of a plate 76 mounted at the center portion on the bracket 74. The screws 75 are adjusted in the plate 76 to position the resilient member 71 into proper frictional engagement with the vials being conveyed by the sprocket chains 15 and 16, as shown in Figures 3 and 8, to impart rotation to said vials on the sprocket chains. The screws 75 are retained in adjusted position by lock nuts 77.

The apparatus as hereinbefore described is also suitable for closing the ends of a tubular glass article shown in Figure 6 as consisting of a straight wall body 78 and a restricted neck portion 79 at one end. The opposite end is normally open and is closed by engaging said articles on the sprocket chains 15 and 16 in engagement with the projections 39 with the neck portions 79 in engagement with and supported by the bar 42 and the open ends projecting from the sprocket chain 15 to travel through the heated zone of the heating element 46 and relative to the open clamping portions 51 of the jaws to be closed by said clamping portions in the same manner as the sealing of the neck portions 38 of the vials, as shown at 80 in Figure 6.

Having thus described my invention, I claim:

1. In apparatus for sealing tubular glass articles, a conveyer arranged to support the articles in equidistantly spaced relation, a heating element positioned in spaced relation to a portion of the conveyer to heat an end portion of the articles on the conveyer, and a head rotatably mounted independently of and rotating relative to the conveyer and heating element and arranged with a plurality of means to engage the extremity of the heated end portions of successive articles on the conveyer and remove the engaged extremities from the heated end portions of the articles by the rotation of the head, the removing of the engaged extremities from the heated end portions of the articles drawing the heated end portions to seal said end portions of the articles.

2. Apparatus for sealing tubular glass articles as claimed in claim 1, wherein the means to engage and remove the extremities of the heated end portions of the articles comprise a series of jaws equidistantly spaced around the head and yieldingly urged to open position, and rails extending relative to the travel of the jaws with the head to engage and move the jaws to engage and remove the extremities of the heated end portions of the articles.

3. In apparatus for sealing tubular glass articles as claimed in claim 1, power means operatively connected to the conveyer and head to continuously actuate said conveyer and head in synchronism with each other.

4. In apparatus for sealing tubular glass articles, a conveyer traveling in a straight path and arranged to support the articles in equidistantly spaced relation, a heating element positioned in spaced relation to a portion of the conveyer to heat an end portion of the articles on the conveyer, and a series of jaws yieldingly urged to open position and traveling adjacent to the travel of the conveyer and a portion of the travel of the jaws being divergent from the path of travel of the conveyer, and rails extending adjacent to the divergent portion of travel and on the opposite sides of the jaws to actuate the jaws into engagement with the extremity of the heated end portions of the articles and maintain the jaws in engagement with said extremities while the jaws travel in said divergent portion of travel to remove the engaged extremities and seal the heated end portions of the articles.

5. In apparatus for sealing tubular glass articles, a pair of parallelly spaced conveyer chains having equidistantly spaced and alined projections to engage and convey the articles with the conveyer chains, a bar extending in juxtaposed relation to one of the conveyer chains to engage one end of the articles and retain the articles on the conveyer chains with the opposite end portions of the articles extending from the other chain, a heating element positioned adjacent the path of travel of the extending end portions of the articles to heat said end portions, and means to engage the extremity of the heated extending end portions of the articles, said means traveling in an arcuate path and relative to the articles on the conveyer chains to remove the engaged extremities from and seal the heated extending end portions of the articles.

6. Apparatus for sealing tubular glass articles as claimed in claim 5, wherein the juxtaposed conveyer chain and bar are adjustable toward and away from the other conveyer chain to properly support and convey articles having a body portion of different lengths relative to the heating element and the sealing means.

7. In apparatus for sealing tubular glass articles, a conveyer arranged to loosely support the articles in equidistantly spaced relation, a heating element extending in spaced relation to a portion of the conveyer to heat an end portion of the articles, a series of equidistantly spaced jaws yieldingly urged to open position and traveling in an arcuate path relative to the heated end portions of the articles on the conveyer, means to close and engage the jaws with the extremities of the heated end portions of the articles and the closed jaws removing the engaged extremities from the heated end portions of the articles by the travel of the jaws in said arcuate path and sealing the heated end portions of the articles, and a member of resilient material extending relative to the conveyer to engage and rotate the articles on the conveyer during the heating and sealing of said articles.

8. Apparatus for sealing tubular glass articles as claimed in claim 7, wherein the member of resilient material is adjustable toward and away from the articles on the conveyer to vary the frictional engagement of said member with the articles.

9. In apparatus for sealing tubular glass articles, a conveyer arranged to support the articles in equidistantly spaced relation, a heating element mounted in spaced relation to the conveyer to heat an end portion of the articles on the conveyer, a head rotatably mounted to extend in the plane of travel of the articles on the conveyer and rotatable relative to the conveyer, a series of jaws pivotally mounted on the peripheral portion of the head in equidistantly spaced relation and yieldingly urged to open position, the path of travel of the jaws intersecting the path of travel of the heated end portions of the articles, and rails extending on the opposite sides of the jaws to engage the jaws at the point of the intersection of the paths of travel of the jaws and heated end portions of the articles and close the jaws upon the extremities of the heated end portions of the articles and remove the extremities from the heated end portions of the articles by the rotation of the head and simultaneously seal the heated end portions.

10. Apparatus for sealing tubular glass articles as claimed in claim 9, wherein the rails extend from the point of intersection of the paths of travel of the jaws and heated end portions of the articles to a point in the travel of the head remote from said point of intersection.

11. Apparatus for sealing tubular glass articles as claimed in claim 9, wherein the head is mounted to have adjustment in the plane of travel of the articles and in directions toward and away from the path of travel of the articles to properly position the jaws relative to the extremities of the articles extending different distances from the conveyer.

12. Apparatus for sealing tubular glass articles as claimed in claim 9, wherein the head is mounted to have adjustment along the axis of rotation thereof to properly position the jaws in axial alinement with the articles on the conveyer and compensate for articles of different diameters.

13. In apparatus for sealing filled glass vials, a traveling conveyer arranged to support the vials in equidistantly spaced relation and inclining lengthwise in an oblique direction from the horizontal with the open end uppermost to prevent spilling of the contents of the vials, a heating element positioned adjacent the path of travel of the open end portions of the vials on the conveyer to heat said end portions, a series of equidistantly spaced jaws yieldingly urged to open position and traveling relative to the vials on the conveyer, a portion of the path of travel of the jaws diverging from the path of travel of the conveyer, and means to engage and close the jaws upon the extremity of the heated end portions of the vials at the point of diversion of the path of travel of the jaws and the diverging travel of the jaws removing the engaged extremities from the heated end portions of the vials and sealing said vials.

14. In apparatus for sealing filled glass vials, a conveyer having the width thereof extending obliquely to the horizontal and arranged to support filled vials with the open ends of the vials uppermost, a heating element mounted to heat the open end portions of the vials on the conveyer, a head rotatably mounted on an axis with the head extending in the plane of the vials on the conveyer, a series of jaws pivotally mounted on the peripheral portion of the head to intersect the path of travel of the heated open end portions of the vials and yieldingly urged to open position, and rails at the opposite sides of the jaws and extending from the point of intersection between the paths of travel of the jaws and the heated open end portions of the vials to a point remote from the conveyer to engage and close the jaws upon the extremity of the heated open end portions of the vials and remove said extremities from and seal the vials by the travel of the jaws from the point of intersection.

15. In apparatus for sealing filled glass vials, a table having a horizontal top, a conveyer supported by the table top with the width thereof extending at an angle of forty-five degrees to the table top and arranged to equidistantly support the vials with the open ends uppermost, a heating element supported by the table and positioned adjacent the path of travel of the open end portions of the vials on the conveyer to heat said end portions, a head rotatably supported by the table top with the axis of rotation extending at an angle of forty-five degrees to the plane of the table top and the head extending in the plane of travel of the vials, a series of jaws pivotally mounted on the peripheral portion of the head in equidistantly spaced relation to intersect the path of travel of the heated open end portions of the vials and yieldingly urged to open position, and rails supported by the table top on opposite sides of the jaws and extending from the point of intersection of the paths of travel of the jaws and the heated open end portions of the vials to a point remote from the conveyer to engage and close the jaws upon the extremities of the heated open end portions of the vials and remove said extremities from and seal the heated open end portions of the vials by the travel of the jaws from the point of intersection.

16. In apparatus for sealing filled glass vials, a table having a horizontal top, a platform mounted on the table top to extend at an angle thereto, a conveyer mounted on the platform with the width of the conveyer extending parallelly of the angle of inclination of the platform and arranged to support the vials in spaced relation with the open ends of the vials extending from the higher side of the conveyer, a heating element mounted on the platform to heat the open ends of the vials, a head rotatably supported by the platform to extend in the plane of travel of the vials on the conveyer, a series of jaws pivotally mounted on the peripheral portion of the head in spaced relation to each other to intersect the path of travel of the heated open ends of the vials on the conveyer and yieldingly urged to open position, and rails supported by the platform to engage the opposite sides of the jaws at the point of intersection of the paths of travel of the jaws and the heated open ends of the vials and close the jaws upon the heated extremities of the open ends of the vials, the travel of the jaws by the rotation of the head removing the engaged extremities from and sealing the open ends of the vials.

17. Apparatus for sealing filled glass vials as claimed in claim 16, wherein the heating element is adjustably mounted to have movement toward and away from the conveyer to properly heat the open ends of the vials extending different distances from the conveyer.

18. In apparatus for sealing tubular glass articles, a pair of endless sprocket chains having projections on equidistantly spaced links to engage and convey the articles on the upper stretches of the chains and one of said chains being adjustable toward and away from the other chain, a plate supporting the upper stretches of the sprocket chains, a bar adjustably mounted on the plate and supporting the adjustable sprocket chain to extend in juxtaposed relation to said chain and engage one end of and support the articles on the chains with the opposite end portions of the articles extending from the other chain, adjustment of the bar on the plate adjusting the adjustable chain to accommodate the apparatus for articles of different lengths, a heating element to heat the extending end portions of the articles on the sprocket chains, and means to seal the heated ends of thee articles.

WALTER A. SHIELDS.

REFERENCES CITED

The following references are of record in the file of this patent:

UNITED STATES PATENTS

| Number | Name | Date |
|---|---|---|
| 2,224,486 | Richter | Dec. 10, 1940 |
| 2,258,408 | Cozzoli | Oct. 7, 1941 |
| 2,270,152 | Themak | Jan. 13, 1942 |

FOREIGN PATENTS

| Number | Country | Date |
|---|---|---|
| 551,599 | France | Apr. 9, 1923 |